May 27, 1924.  1,495,345
H. NEIVERT
EYE TESTING APPARATUS
Filed Nov. 30, 1921  2 Sheets-Sheet 1
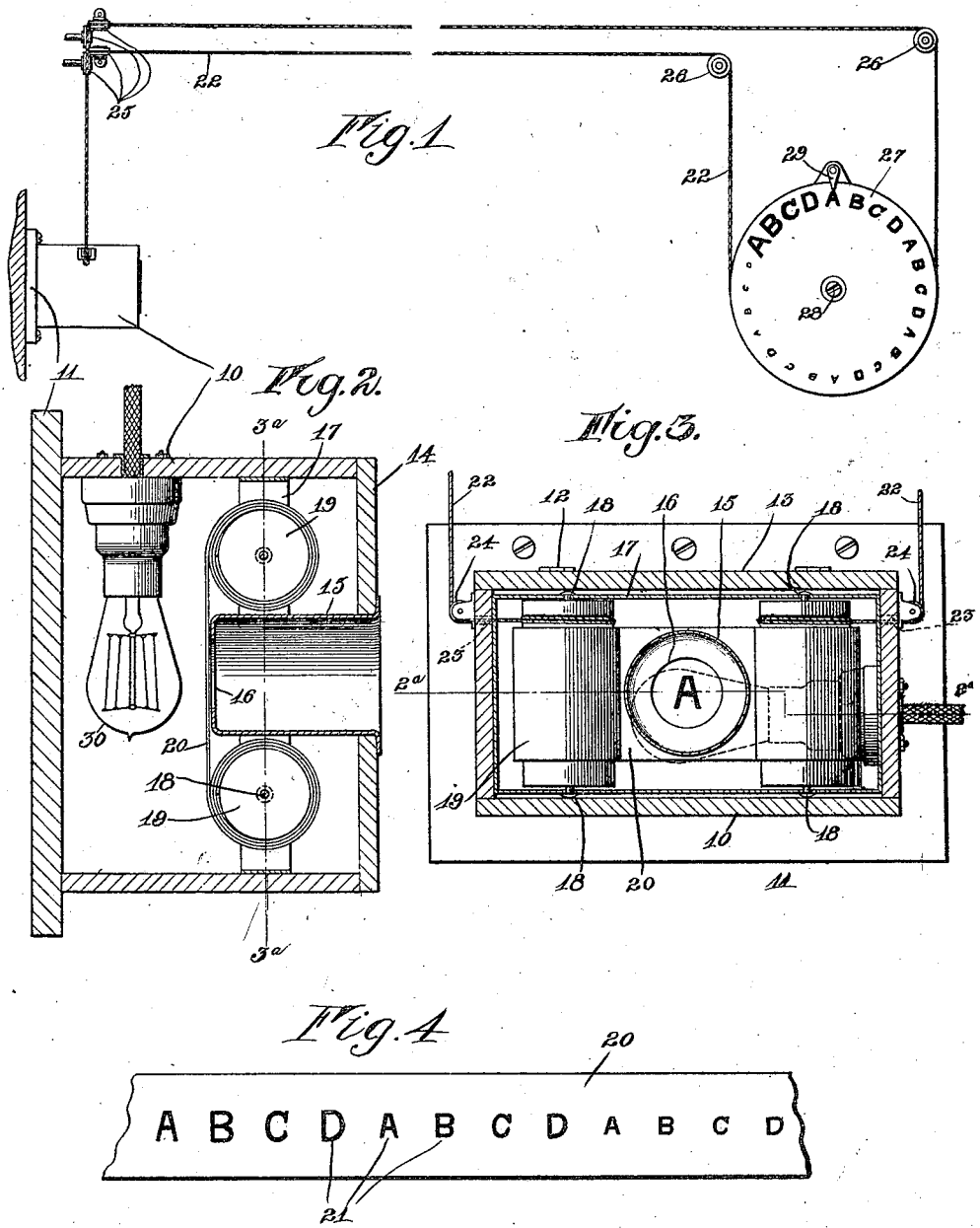
INVENTOR.
Harry Neivert.
BY
his ATTORNEY.

May 27, 1924.
H. NEIVERT
EYE TESTING APPARATUS
Filed Nov. 30, 1921
1,495,345
2 Sheets-Sheet 2
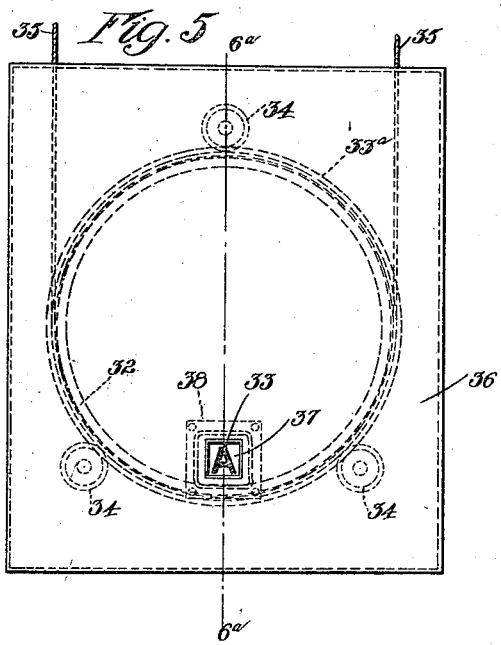
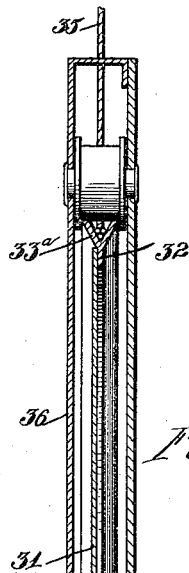
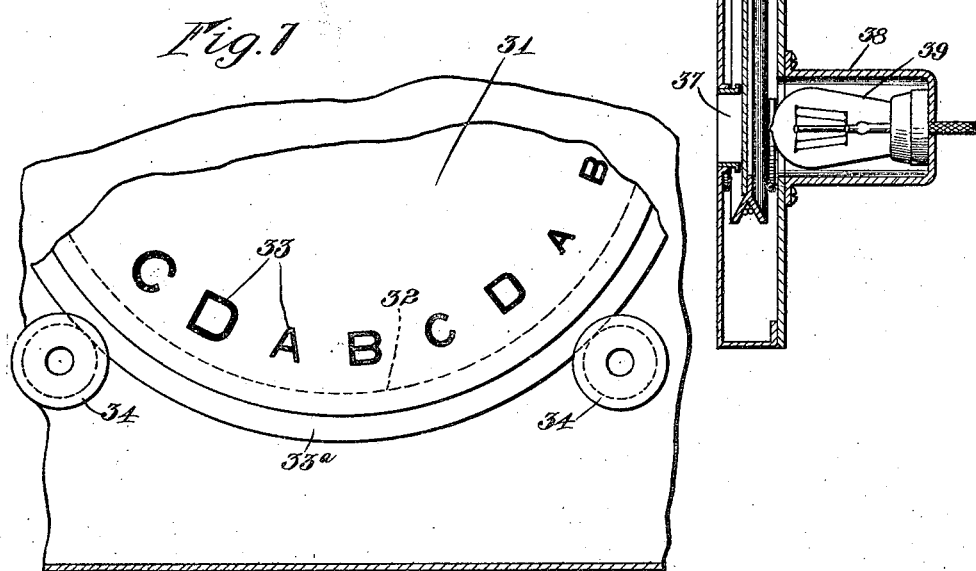
INVENTOR.
Harry Neivert.
BY
His ATTORNEY.

Patented May 27, 1924.

1,495,345

UNITED STATES PATENT OFFICE.

HARRY NEIVERT, OF ROCHESTER, NEW YORK.

EYE-TESTING APPARATUS.

Application filed November 30, 1921. Serial No. 518,969.

*To all whom it may concern:*

Be it known that I, HARRY NEIVERT, a citizen of the United States, and a resident of Rochester, in the county of Monroe and State of New York, have invented certain new and useful Improvements in Eye-Testing Apparatus; and I do hereby declare the following to be a full, clear, and exact description of the same, reference being had to the accompanying drawings, forming a part of this specification, and to the reference numerals marked thereon.

This invention relates to eye testing apparatus, and, more particularly, to the variety for displaying characters or symbols for reading at a distance by an individual whose sight is to be tested. One object of the invention is to provide a practical apparatus of this character by means of which an operator can display a plurality of testing symbols, selectively, one at a time in arbitrary sequence, and thus eliminate in the visual identification of the symbol displayed, the influence of any knowledge of the symbols and their order of arrangement which may have been previously acquired by the individual whose sight is being tested.

Another object is the provision of an apparatus of the above character having means for artificially illuminating the symbols effectively and uniformly and substantially independently of extraneous light conditions.

Still a further object is to provide such an apparatus with efficient and convenient means for moving the chart carrying the testing symbols so as to bring the latter selectively and individually into view. To these and other ends the invention resides in certain improvements and combinations of parts all as will hereinafter be more fully described, the novel features being pointed out in the claims at the end of the specification.

In the drawings:

Figure 1 is a side elevation of an apparatus embodying the present invention;

Figure 2 is an enlarged sectional plan view of the same on the line 2ª—2ª of Figure 3;

Figure 3 is a sectional elevation on the line 3ª—3ª of Figure 2;

Figure 4 shows a portion of the chart marked with the testing symbols;

Figure 5 is an elevation of a modified form of the apparatus;

Figure 6 is an enlarged sectional elevation on the line 6ª—6ª of Figure 5; and

Figure 7 is a fragmentary enlarged view showing the details of the chart supporting means.

Similar reference numerals throughout the several views indicate the same parts.

The preferred embodiment of the invention comprises a housing or casing adapted to be secured to a wall or other support and containing a movable test chart and a light source for illuminating the same, the front side of the housing having a sight opening at which the symbols of the chart are brought to view, selectively and individually, by movement of the latter. Referring more particularly to the drawings, the housing is indicated generally at 10 as having a base board 11 adapted to be secured to a wall. Movably supported on board 11, as by means of hinges 12, is the top wall 13 of the housing which comprises also a bottom and end walls and a front wall 14. The latter has extending through an opening therein a sight tube 15 which preferably projects to some distance inwardly of the wall 14 and has in its inner end a circular opening 16 through which the testing symbols are viewed.

The chart carrying the symbols is arranged for movement across the inner end of the sight tube 15. For this purpose a substantially rectangular sheet metal frame 17 is carried by the end walls of the housing, and the upper and lower sides of this frame 17 have bearing openings formed therein in which are rotatably received the trunnions 18 of a pair of rollers 19, one of which is located on either side of the sight tube 15. The chart, as indicated at 20, is formed by a flexible band or strip of fabric or other material of a translucent but not transparent character on which are opaquely marked the testing symbols 21. The latter, as usual in apparatus of this character, preferably comprise groups of letters of the alphabet of progressively varying sizes and are spaced from each other as shown, so that they may be disposed by movement of the chart one at a time at the sight opening 16. The ends of the chart are secured to and wound upon the respective rollers 19, the chart thus passing as already indicated across the inner end of the sight tube.

Means are provided for simultaneously rotating rollers 19 in either direction to unwind the chart from one roller and wind it on the other and by such movement to bring the symbols selectively and individually to stationary position opposite the sight opening. Such means comprises preferably a flexible element, such as a cord 22, arranged in a loop the ends of which are fixed to and wound on rollers 19 respectively. From the latter the sides of the cord loop are carried through openings 23 in the ends of the housing and over guide rollers 24 and it is apparent that by exerting tension on one side or the other of the cord loop the rollers may be rotated in one direction or the other to adjust the chart in the manner indicated, the other portion of the loop being wound on the other roller as the chart is unwound therefrom. The cord outside the housing is carried over guide pulleys 25 of any suitable construction supported by means of brackets on the walls of the room in which the apparatus is located, and thence extended forwardly of the instrument to a point behind the station of the individual whose sight is to be tested and adjacent the station of the operator. At this point the cord is carried downwardly over pulleys 26, and its bight passed about the periphery of a disc 27 for rotating the latter on a pivot 28 as the cord is moved to move the chart. Disc 27 is provided with a plurality of symbols corresponding to those on the chart and with an index 29, these parts being so arranged that the index points to the character on the disc corresponding to the character or symbols of the chart which is opposite the sight opening. Various other dispositions, of course, may be made of the operating cord 22 outside of the housing, the arrangement described above being one which has been found advantageous as conveniently indicating to the operator how to move the chart directly to bring any desired symbol into view.

The chart is preferably illuminated by an incandescent electric light 30 supported on one of the end walls of the housing with its filament on the side of the chart opposite the sight opening. The chart is thus effectively illuminated directly opposite the symbol displayed, the translucent chart and the opaque symbol serving to throw the latter into sharp contrast with the chart, so that it is distinctly shown. The provision of the sight tube of substantial length serves to prevent rays of extraneous light from passing through the sight opening 16 and affecting the illumination of the chart which is thus maintained uniform.

Figures 5, 6 and 7 show a modification of the invention embodying the same general principles but in which the chart 31 is in the form of a disc supported at its periphery on a ring 32. The chart is marked about its periphery with spaced testing symbols 33 similar to those employed on the chart previously described, this chart also being of translucent material and the symbols marked opaquely thereon for contrast. The outer circumference of ring 32 is grooved as at 33ª, the circumference being in rolling engagement with three supporting rollers 34 which hold the ring rotatably in position. The grooved periphery of the ring provides for the winding of a cord 35 thereon by means of which it is rotated to adjust the chart. The parts described are enclosed by a housing 36 in the sides of which the rollers 34 are journalled. The forward side of the housing carries a sight tube 37 extending inwardly thereof opposite the path of movement of the symbols as the chart is rotated and the rear side of the housing carries an auxiliary casing 38 in which is supported an incandescent lamp 39 in rear of the chart and opposite the symbols. It is evident that cord 35 may be manipulated to rotate the chart and bring the testing symbols selectively and individually opposite the sight tube as in the preferred construction.

The apparatus is simple and practical in construction, providing for convenient movement of the chart to bring any desired symbol opposite the sight opening. As but one symbol is visible at a time and as these symbols may be brought into view in any arbitrary order of sequence, the individual whose sight is being tested must identify the same independently of any previously acquired knowledge of the symbols or of their order of arrangement on the chart. The various parts are so disposed and arranged with regard to optical principles as to afford sufficient illumination on the chart of a uniform character independent of light conditions outside the housing. The apparatus is furthermore compact and convenient to install and presents a pleasing appearance.

I claim as my invention:

1. An eye testing apparatus comprising a housing wall, a movable chart marked with a series of testing symbols, a light source on the same side of said wall as the chart for illuminating the latter, a sight tube extending through the wall for viewing said symbols individually and for excluding extraneous light, and means for moving said chart to bring said symbols selectively into view opposite said tube.

2. An eye testing apparatus comprising a housing wall, a translucent chart spaced from said wall and marked with a series of opaque testing symbols, a light source on the side of the chart opposite the wall, a sight tube extending through the wall and from the latter toward the chart for viewing the symbols and excluding extraneous light, and means supporting the chart for movement to bring the symbols selectively and individually into view at said sight tube.

3. An eye testing apparatus comprising a closed housing a translucent chart therein having a series of opaque symbols marked thereon in spaced relation, a sight tube extending through a side of the housing into proximity with the chart for viewing said symbols individually and excluding extraneous light, a light source in the housing on the side of the chart opposite the sight tube, and means supporting the chart for movement to bring said symbols selectively and stationarily into view at said tube.

4. An eye testing apparatus comprising a closed housing, a sight tube extending through a side of the housing, rollers rotatably supported in the housing on opposite sides of the sight tube, an elongated chart marked with a series of spaced symbols and extended across said tube with its ends wound on the rollers, respectively, a light source in the housing for illuminating the chart, and flexible means extended exteriorly of the housing for rotating the rollers and bring said symbols selectively and individually into view opposite said sight tube.

5. An eye testing apparatus comprising a closed housing, a sight tube extending through a side of the housing, rollers rotatably supported in the housing on opposite sides of the sight tube, a chart in the housing in the form of a strip of translucent material marked with spaced opaque symbols and extended across the end of said tube with its ends wound on said rollers respectively, a light source in the housing on the side of the chart opposite said tube, and flexible means extended exteriorly of the housing for rotating said rollers and moving the chart to bring said symbols into alignment, selectively and individually, with said tube.

HARRY NEIVERT.